(12) United States Patent
Cogordan et al.

(10) Patent No.: US 9,969,840 B2
(45) Date of Patent: May 15, 2018

(54) SPECIFIC METHOD FOR PREPARING BIOBASED POLYESTERS

(71) Applicant: Arkema France, Colombes (FR)

(72) Inventors: Frank Cogordan, Paris (FR); Herve W. Ozeray, Estrees Saint Denis (FR); Alain F. Riondel, Saint Pathus (FR)

(73) Assignee: Arkema France, Colombes (FR)

( * ) Notice: Subject to any disclaimer, the term of this patent is extended or adjusted under 35 U.S.C. 154(b) by 0 days. days.

(21) Appl. No.: 15/509,498

(22) PCT Filed: Sep. 10, 2015

(86) PCT No.: PCT/FR2015/052408
§ 371 (c)(1),
(2) Date: Mar. 8, 2017

(87) PCT Pub. No.: WO2016/038303
PCT Pub. Date: Mar. 17, 2016

(65) Prior Publication Data
US 2017/0306087 A1  Oct. 26, 2017

(30) Foreign Application Priority Data
Sep. 12, 2014 (FR) ...................... 14 58600

(51) Int. Cl.
*C08G 63/91* (2006.01)
*C08G 63/672* (2006.01)
*C08G 63/85* (2006.01)

(52) U.S. Cl.
CPC ......... *C08G 63/916* (2013.01); *C08G 63/672* (2013.01); *C08G 63/85* (2013.01)

(58) Field of Classification Search
CPC ..... C08G 63/916; C08G 63/85; C08G 63/672
See application file for complete search history.

(56) References Cited

U.S. PATENT DOCUMENTS

| | | | |
|---|---|---|---|
| 2002/0115817 A1 | 8/2002 | Hayes | |
| 2007/0276065 A1* | 11/2007 | Barton | ................ C08G 63/199 524/132 |
| 2011/0290696 A1* | 12/2011 | Stenson | ............... C08G 18/423 206/524.3 |
| 2012/0220676 A1 | 8/2012 | Moens | |
| 2013/0197152 A1 | 8/2013 | Herve et al. | |
| 2014/0371419 A1 | 12/2014 | Farrugia et al. | |
| 2015/0031828 A1 | 1/2015 | Roussel et al. | |

OTHER PUBLICATIONS

Bart A. J. Noordover., et al—Bio Macromlecules, ACS Publications "Co- and Terpolyesters Based on Isosorbide and Succinic Acid for Coating Applications: Synthesis and Characterization " Biomacromolecules; 2006, 7 (12), pp. 3406-3416—DOI 10.1021/bm060713v.

* cited by examiner

*Primary Examiner* — Robert Jones, Jr.
(74) *Attorney, Agent, or Firm* — Lynn B. Morreale

(57) ABSTRACT

The present invention relates to a method for preparing a linear or branched hydroxylated and/or carboxylated polyester resin that is free of unsaturated fatty acids, comprising reacting an acid component with an alcohol component, said acid component comprising at least one C4 to C6 polycarboxylic acid or anhydride, and at least one C8 to C54 polycarboxylic acid or anhydride, and said alcohol component comprising at least one biobased polyol having a functionality of at least 2 bearing a 1,4:3,6-dianhydrohexitol unit, and at least one of two polyols b2) and b3).

23 Claims, No Drawings

SPECIFIC METHOD FOR PREPARING BIOBASED POLYESTERS

CROSS-REFERENCE TO RELATED APPLICATIONS

This application is a national stage application under 35 U.S.C. § 371 of PCT/FR2015/052408, filed Sep. 10, 2015 which claims benefit to application FR14.58600, filed Sep. 12, 2014.

The invention relates to a process for preparing a polyester resin having a linear or branched structure and free of unsaturated fatty acids, which is hydroxylated or carboxylated, based on renewable raw materials, and in particular at least based on a specific biobased polyol.

Oil-free functionalized polyester resins are well known for coating applications for metal sheets known as coils.

Polyol polyester resins based on components of renewable origin, also known as biobased, for application in coatings of metal sheets are already described in WO 2012/042153 and in particular oil-free resins. These polyester resins are based on rosin. However, as such, they need to be improved in terms of durability and resistance to yellowing.

B. A. Noordover et al, describe, in J. Biomacromolecules, 2006, 7, 3406-3416 co- and terpolyesters based on isosorbide and succinic acid and other monomers of renewable origin, such as 2,3-butanediol or 1,3-propanediol or citric acid.

No presence of polyacids having an at least $C_8$ longer chain is mentioned or suggested in these documents.

The present invention seeks to develop, by means of a specific process, novel hydroxylated or carboxylated polyester resins which are oil-free and free of any unsaturated fatty acid residue, having an improved durability and resistance to yellowing and an improved hardness/flexibility compromise while at the same time having good chemical resistance, in particular to organic solvents and to water, with regard to the coating obtained, in particular for application on metal sheets.

The subject of the present invention relates to a process for preparing a linear or branched polyester resin which is hydroxylated and/or carboxylated, based on a specific composition with renewable raw materials and in particular based on a specific biobased polyol. More specifically, the subject of the invention relates to a process for preparing a hydroxylated or carboxylated, possibly hydroxylated and carboxylated, linear or branched polyester resin free of unsaturated fatty acid, said process comprising the reaction between an acid component a) and an alcohol component b), with said acid component a) comprising:

a1) at least one $C_4$ to $C_6$ polycarboxylic acid or anhydride, preferably having a functionality $f_{a1}$ ranging from 2 to 4 and more preferentially equal to 2, a2) at least one $C_8$ to $C_{54}$ polycarboxylic acid or anhydride, preferably having a functionality $f_{a2}$ ranging from 2 to 4 and more preferentially equal to 2 and a3) optionally, at least one $C_2$ to $C_{22}$ saturated monoacid, which can optionally bear a hydroxyl group, and with said alcohol component b) comprising:

b1) at least one biobased polyol having a functionality $f_{b1}$ of at least 2, preferably 2, bearing a 1,4:3,6-dianhydrohexitol unit, and at least one of the following two polyols b2) and b3):

b2) at least one polyol different than b1) having a functionality $f_{b2}$ of at least 2, preferably 2, which is more particularly $C_3$ to $C_{36}$, b3) at least one polyol different than b1) and than b2) having a functionality $f_{b3}$ of at least 3, preferably 3, with said reaction being carried out according to the following successive steps:

i) reaction of all of the acid component a) with said component b1) of said alcohol component b) and until a conversion of at least 85%, preferably of 100% of said component b1) is obtained, followed by ii) reaction of the product resulting from step i) with the rest of said alcohol component b), comprising at least one of said polyols b2) or b3), the reactions of steps i) and ii) taking place in solution in at least one organic solvent which can form an azeotrope with water.

According to one particular option, the two polyols b2) and b3) as defined above are present in said component b).

Said solvent according to this process allows both the azeotropic effect and the removal of the water of the reaction, in particular of said step i) and also the dissolution of the reactive components, in particular of step i).

Said organic solvent may in particularly be selected from: ketones, in particular methyl amyl ketone, methyl isobutyl ketone, 2-heptanone, 2-octanone and more particularly methyl amyl ketone, methyl isobutyl ketone or 2-heptanone, aromatic solvents, in particular xylene or toluene, cycloaliphatic solvents, in particular cyclohexane or alkanes which are at least $C_7$ alkanes and preferably ketones, in particular methyl amyl ketone and methyl isobutyl ketone.

More particularly, said step i) can be carried out in the presence of a catalyst chosen from:

tin derivatives, in particular tin oxalate or butylstannoic acid or tin(II) oxide, titanium derivatives, in particular alkyl titanates such as ethyl titanate, isopropyl titanate, butyl titanate or 2-ethylhexyl titanate and more particularly isopropyl titanate and butyl titanate.

The amount by weight of said catalyst relative to the weight of all of the reactants of step i) b1)) can in particular range from 0.01% to 0.5% and preferably from 0.01% to 0.25%.

Step i) of said process can be carried out at a temperature ranging from 150 to 220° C. and preferably from 175 to 220° C.

With regard to said step ii), it can be carried out at a temperature ranging from 180 to 250° C. and preferably from 190 to 220° C.

A biobased resin or product means that it comprises a raw material of non-fossil origin which is renewable and of plant or animal origin.

The "biobased" characteristic of a product or resin or of a raw material used as component of said product, such as a polyacid, a polyol or a fatty acid, can be determined by determining the $^{14}C$ carbon content, which attests to the renewable origin of the carbon of said component as such or incorporated into a final product after reaction (which in no way modifies this content). This is because a biobased component is a component in which the carbon comes from carbon dioxide ($CO_2$) fixed by photosynthesis from the Earth's atmosphere. The specific fixed content of $^{14}C$ carbon is the signature of a biobased component which differs from that corresponding to a component of fossil origin. This content can be determined according to ASTM D 6866 (ASTM D 6866-06) or ASTM D 7026 (ASTM D 7026-04), in particular by mass spectrometry according to ASTM D6866-06.

With regard to the resin prepared by means of this process, a fraction by weight of at least 50%, preferably of at least 75% of said polyol b) is biobased.

More particularly, said biobased component b1) is chosen from: isosorbide (1,4:3,6-dianhydro-D-sorbitol), isomannide (1,4:3,6-dianhydro-D-mannitol) or isoidide (1,4:3,6-dianhydro-L-iditol).

According to one more particular option, at least 50%, preferably at least 75%, by weight relative to the overall weight of said components a)+b) is biobased.

Even more particularly, the components a) and b) are 100% biobased.

According to another particular option, said polyol b2) is biobased and chosen from 1,3-propylenediol or 1,2-propylenediol, 1,4-butanediol or diols based on (meaning derived from) saturated fatty acids. Such diols can have a $C_{12}$ to $C_{36}$ chain.

Even more particularly, said polyol b3) may be biobased and chosen from glycerol and ether-polyol derivatives thereof, such as polyglycerols which are oligomer derivatives of glycerol.

Said polyacid a1) includes in its coverage acids such as aconitic acid resulting from sugar cane, which is of $C_6$ and has a functionality $f_{a1}=3$. The polyacid a1) may also bear a group among hydroxyl such as citric acid with $f_{a1}=3$ and additionally bearing a hydroxyl or malic function with $f_{a1}=2$ and bearing a hydroxyl or glutamic acid with $f_{a1}=2$ and bearing an amine group.

With regard to said polyacid a1), according to a particular choice, it is a biobased aliphatic diacid chosen from: succinic acid, tartaric acid, citric acid, malic acid, itaconic acid, glutaric acid, glutamic acid, fumaric acid, furandicarboxylic acid, tetrahydrofuran-2,5-dicarboxylic acid or tetrahydrofuran-3,5-dicarboxylic acid, preferably succinic acid, itaconic acid, glutamic acid, fumaric acid, furandicarboxylic acid or tetrahydrofuran-2,5-dicarboxylic acid or tetrahydrofuran-3,5-dicarboxylic acid.

In the case where the functionality of one of the components mentioned is greater than 2, the number-average functionality of the mixture of the components a)+b) preferably does not exceed 2. Said polyester thus has a linear or branched structure and, by definition, it cannot comprise a crosslinked structure, which is thus by definition excluded. Those skilled in the art know in particular how to choose the proportions and the functionalities of reactive components and also the degree of conversion of the reactive functions in order to avoid any chemical gelling or crosslinking of the reactive system. This question can only arise when one of the reactive components (a) and (b) has an average functionality greater than 2 so as to obtain a branched structure. It is possible to control the structure without any possible crosslinking, by adjusting the proportions of the components a) and b) such that the number-average functionality (per mole of reactant component) relative to all of the reactive components (a+b) does not exceed 2 or, if it exceeds 2, to limit the degree of conversion well before the gel point (gelling) which can be predicted either by experimentation or by calculation according to the Macosko-Miller relationship and/or by gradual addition of the least functionalized component to the most functionalized component with efficient stirring (reactive functions maintained in excess by the gradual addition of the second reactive component). The Macosko-Miller relationship mentioned above is as defined according to Macromolecules, vol. 9, pages 199-211 (1976) and is considered to be well known to those skilled in the art. For greater clarity, this relationship is recalled below, said relationship linking the critical ratio $r_c$ of the reactive functions for two reactive components A and B to the gel point, $r_c$=functions A/functions B, with the average functionality of A being $f_A$, and that of B being $f_B$ with the critical degree of conversion at the gelling point $x_g$ below:

$$r_c * x_g^2 = 1/[(f_B-1)*(f_A-1)]$$

Said polyacid a2) may also be biobased and chosen from: azelaic acid ($C_9$), sebacic acid ($C_{10}$), undecanedioic acid, dodecanedioic acid or respectively $C_{36}$ and $C_{54}$ fatty acid dimers and trimers. The presence of this diacid a2) and its proportion relative to a1) are important factors for adjusting the hardness/flexibility compromise of the final coating and adjusting the hardness/flexibility ratio, the increase in the content of a2) improves the flexibility. Conversely, the hardness of the coating increases as the content of a1) increases.

Preferably, the a1)/a2) molar ratio ranges from 2 to 8 and more preferentially from 3 to 7.

With regard to said monoacid a3), it may be selected from: acetic acid, pyruvic acid, lactic acid or rosin (abietic acid and $C_{20}$ isomers) or a $C_{12}$ to $C_{22}$ saturated fatty acid.

Said biobased polyol b1) may in particular represent at least 40 mol/mol % relative to the component b).

According to one particular and preferred mode of said resin, said polyol b1) represents at least 30% by weight of said resin, this weight of "said resin" meaning herein "relative to the total weight of the components a)+b) used for said resin".

More particularly, the content of polyol b1) as mol/mol % relative to all of the alcohol component b) ranges from 40 to 80 and preferably from 55 to 65.

The content corresponding to the polyol b2) can range from 0 to 50 and preferably from 25 to 35.

The molar content of the polyol b3) can range from 0 to 20 and preferably from 5 to 15. The contents of b1), b2) and b3) as given are chosen in the ranges as defined by also taking into account that the sum b1)+b2)+b3) is equal to 100%.

Furthermore, it is preferred for the molar ratio between the polyacids a1) and a2) to range from 2 to 8 and in particular from 3 to 7.

With regard to the OH or carboxy, optionally OH and carboxy, functionality of said resin, it can correspond to an OH and/or acid number ranging from 10 to 200 mg KOH/g.

More particularly, said resin can have a carboxylic acid (carboxy) functionality corresponding to an acid number of less than 20, preferably less than 10 and more preferentially less than 5 and in particular 0 mg KOH/g and an OH functionality corresponding to an OH number ranging from 10 to 200, preferably from 10 to 150, more preferentially from 10 to 100 mg KOH/g. The OH number is determined according to ISO 2554. The acid number is determined according to ISO 2114.

The resin according to the invention can thus be OH-functionalized or carboxy-functionalized or OH— and carboxy-functionalized and preferably, in the latter case, with a predominant OH functionality, that is to say with more than 90% of functional groups being OH.

With regard to the number-average molecular weight Mn of said resin, it can range from 500 to 20 000 and preferably from 750 to 10 000. This molecular weight Mn is determined by calculation from the functionality number (in mg KOH/g) and from the average functionality $f_r$ of said resin which represents the average number of OH and/or carboxy acid functions, calculated from the material balance (molar proportions) and from the known functionality of the components a) and b) used.

During the first step i), the molar ratio of the carboxy ($CO_2H$) groups of said component a) relative to the OH groups of said polyol b1) can range from 1.1 to 2.1 and preferably from 1.2 to 2, more preferentially from 1.3 to 1,9.

This $CO_2H$/OH ratio is important for the high and up to total conversion of said polyol b1), in particular isosorbide.

As regards said hydroxylated and/or carboxylated resin, it can have a corresponding functionality number (OH or carboxy acid) ranging from 10 to 200 mg KOH/g.

The functionality is regulated according to the nature of the component (a) or b)) in overall stoichiometric excess relative to the other. When it is the carboxy groups which are significantly in overall excess, relative to all of the components a)+b), the functionality will be carboxy. Conversely, if it is the OH groups which are thus in excess, the functionality of said resin will be OH.

Among the advantages of the process of the present invention, mention may be made of: the virtually total conversion of the polyol b1) without coloration of the final resin and with good control of the structure and of the functionality of said resin.

The following examples are given by way of illustration of the invention and of the advantages thereof and in no way limit the scope of the invention.

EXPERIMENTAL SECTION

1) Raw Materials Used

TABLE 1 raw materials used

| Trade name | Chemical name | Supplier | Technical function | Nature function and functionality | Component of type according to the invention |
|---|---|---|---|---|---|
| Polysorb ® P | isosorbide | Roquette | Diol* | OH/2 | b1) |
| Oleris ® Sebacic acid | Sebacic acid | Arkema | Diacid* | Carboxy/2 | a2) |
| BIO-SA ® | Succinic acid | Bio Amber | Diacid* | Carboxy/2 | a1) |
| Glycerine ® 4813 | Glycerol | Oleon | Triol* | OH/3 | b3) |
| Fascat ® 4100 | Butylstannoic acid | PMC Organo Metallix | Catalyst | — | Catalyst |
| MIBK | Methyl isobutyl ketone | Arkema | Azeo solvent | — | Azeo solvent |
| MPA | Methoxypropyl acetate | BASF | Resin solvent | — | Resin solvent |

*biobased

2) Preparation of the Resin (Procedure Example 1)

An electrically heated three-liter reactor, equipped:
with a distillation column of the Vigreux type surmounted by a Dean Stark separator,
with a dip tube for introducing nitrogen,
with a temperature probe,
is charged with:
582 g of isosorbide,
246.8 g of sebacic acid,
380.9 g of succinic acid,
0.13 g of Fascato 4100 (butylstannoic acid)

Under a nitrogen flow, the mixture is heated to 150° C. and 50.62 g of methyl isobutyl ketone (MIBK) are introduced as azeotropic entrainer (solvent). Heating is then carried out, up to 220° C., while at the same time removing the reaction water in the form of a heteroazeotrope with the MIBK until a constant acid number of 165 mg KOH/g is reached, corresponding to a degree of conversion of the isosorbide of 99.5%. The duration of this first step is 8 h. Cooling is carried out at 180° C. and 55.7 g of glycerol are introduced into the reactor. The reaction medium is brought to 220° C., still under nitrogen, until an acid number <10 mg KOH/g is obtained. The reactor is cooled to 150° C. and 617.57 g of methoxypropyl acetate (MPA) are added as solvent for diluting the resin. At 90° C., the reactor is emptied and the dry extract is adjusted by adding 68.62 g of MPA.

The final characteristics of the product are:
Coloration: 3 Gardner (ISO method 4630)
Dry extract: 60% (ISO method 3251)
Brookfield viscosity at 25° C. (ISO method 3219): 4350 mPa·s
Acid number: 8 mg KOH/g (ISO method 2114)
OH number (essential functionality) (mg KOH/g): 70 (ISO method 2554)
Isosorbide measured by carbon 13 NMR analysis: 0.1% in the solvented resin, which
corresponds to a final degree of conversion of the isosorbide of 99.7%.

Example 2

Example 1 is reproduced, with the MIBK being replaced with xylene.

The isosorbide content in the final product is 1%, which corresponds to a degree of conversion of the isosorbide of 96%.

Comparative Example 1

Example 1 is reproduced, while changing all the reagents in a single step.

The isosorbide content in the final product is 5%, which corresponds to a degree of conversion of the isosorbide of 82%.

The two-step process according to the invention makes it possible to virtually quantitatively convert the isosorbide to a final degree of at least 96%, preferably of at least 99%.

The invention claimed is:

1. A process for preparing a hydroxylated or carboxylated, optionally hydroxylated and carboxylated, linear or branched polyester resin free of unsaturated fatty acid, wherein said process comprises reaction between an acid component a) and an alcohol component b), with said acid component a) comprising:
   a1) at least one $C_4$ to $C_6$ polycarboxylic acid or anhydride,
   a2) at least one $C_5$ to $C_{54}$ polycarboxylic acid or anhydride, and
   a3) optionally, at least one $C_2$ to $C_{22}$ saturated monoacid, and
   with said alcohol component b) comprising:
   b1) at least one biobased polyol having a functionality $f_{b1}$ of at least 2, preferably 2, bearing a 1,4:3,6-dianhydrohexitol unit,
   and at least one of two polyols b2) or b3):
   b2) at least one polyol different than b1) having a functionality $f_{b2}$ of at least 2,
   b3) at least one polyol different than b1) and b2) having a functionality $f_{b3}$ of at least 3,
   with said reaction being carried out according to the following successive steps:
   i) reaction of all of the acid component a) with said component b1) of said alcohol component b) until a conversion of at least 85%, of said component b1) is obtained, followed by
   ii) reaction of the product resulting from step i) with the rest of said alcohol component b), comprising at least one of said polyols b2) or b3),
   the reactions of said steps i) and ii) taking place in solution in at least one organic solvent which can form an azeotrope with water.

2. The process as claimed in claim 1, wherein said step i) is carried out in the presence of a catalyst chosen from:
   tin derivatives from tin oxalate, butylstannoic acid or tin(II) oxide, titanium derivatives from alkyl titanates.

3. The process as claimed in claim 2, wherein the amount by weight of said catalyst relative to the weight of all of the reactants of step i) (a)+b1)) ranges from 0.01% to 0.5%.

4. The process as claimed in claim 1 wherein said step i) is carried out at a temperature ranging from 150 to 220° C.

5. The process as claimed in claim 1 wherein said step ii) is carried out at a temperature ranging from 180 to 250° C.

6. The process as claimed in claim 1 wherein said organic solvent is selected from the grow consisting of ketones, aromatic solvents, cycloaliphatic solvents, and alkanes which are at least $C_7$ alkanes.

7. The process as claimed in claim 1 wherein a fraction by weight of at least 50% of said polyol b) is biobased.

8. The process as claimed in claim 1 wherein said component b1) is chosen from the group consisting of isosorbide (1,4:3,6-dianhydro-D-sorbitol), isomannide (1,4:3,6-dianhydro-D-mannitol) and isoidide (1,4:3,6-dianhydro-L-iditol).

9. The process as claimed in claim 1 wherein at least 50% by weight relative to the overall weight of said components a)+b) is biobased.

10. The process as claimed in claim 1 wherein the components a) and b) are 100% biobased.

11. The process as claimed in claim 1 wherein said polyol b2) is biobased and chosen from the groups consisting of 1,3-propylenediol, 1,2-propylenediol, 1,4-butanediol, and dials based on saturated fatty acids.

12. The process as claimed in claim 1 wherein said polyol b3) is biobased and chosen from the group consisting of glycerol and ether-polyol derivatives thereof.

13. The process as claimed in claim 1 wherein said polyacid a1) is a biobased aliphatic diacid chosen from the group consisting of succinic acid, tartaric acid, citric acid, malic acid, itaconic acid, glutaric acid, glutamic acid, fumaric acid, furandicarboxylic acid, tetrahydrofuran-2,5-dicarboxylic acid and tetrahydrofuran-3,5-dicarboxylic acid.

14. The process as claimed in claim 1 wherein said polyacid a2) is biobased and chosen from the group consisting of azelaic acid ($C_9$), sebacic acid ($C_{10}$), undecanedioic acid, dodecanedioic acid and respectively $C_{36}$ and $C_{54}$ fatty acid dimers and trimers.

15. The process as claimed in claim 1 wherein said monoacid a3) is selected from the groom consisting of acetic acid, pyruvic acid, lactic acid, rosin (which means abietic acid and $C_{20}$ isomers) and a $C_{12}$ to $C_{22}$ saturated fatty acid.

16. The process as claimed in claim 1 wherein said polyol b1) represents at least 40 mol/mol % relative to the component b).

17. The process as claimed in claim 1 wherein during the first step i), the molar ratio of the carboxy groups of said component a) relative to the OH groups of said polyol b1) ranges from 1.1 to 2.1.

18. The process of claim 1, wherein said at least one $C_4$ to $C_6$ polycarboxylic acid or anhydride has a functionality $f_{a1}$ ranging from 2 to 4 and the at least one $C_9$ to $C_{54}$ polycarboxylic acid or anhydride has a functionality $f_{a2}$ ranging from 2 to 4.

19. The process of claim 1, wherein the said polyol b2) is a polyol in $C_3$-$C_{36}$.

20. The process of claim 1, wherein $f_{a1}=2$, $f_{a2}=2$, $f_{b1}=2$, $f_{b2}=2$ and $f_{b3}=3$.

21. The process of claim 1, wherein the reaction of all of the acid component a) with said component b1) of said alcohol component b) proceeds until a conversion of 100% of said component b1) is obtained.

22. The process of claim 2, wherein said alkyl titanates are selected from the group consisting of ethyl titanate, isopropyl titanate, butyl titanate, and 2-ethylhexyl titanate.

23. The process of claim 22, wherein said alkyl titanates are selected from the group consisting of isopropyl titanate and butyl titanate.

* * * * *